Figure 1:
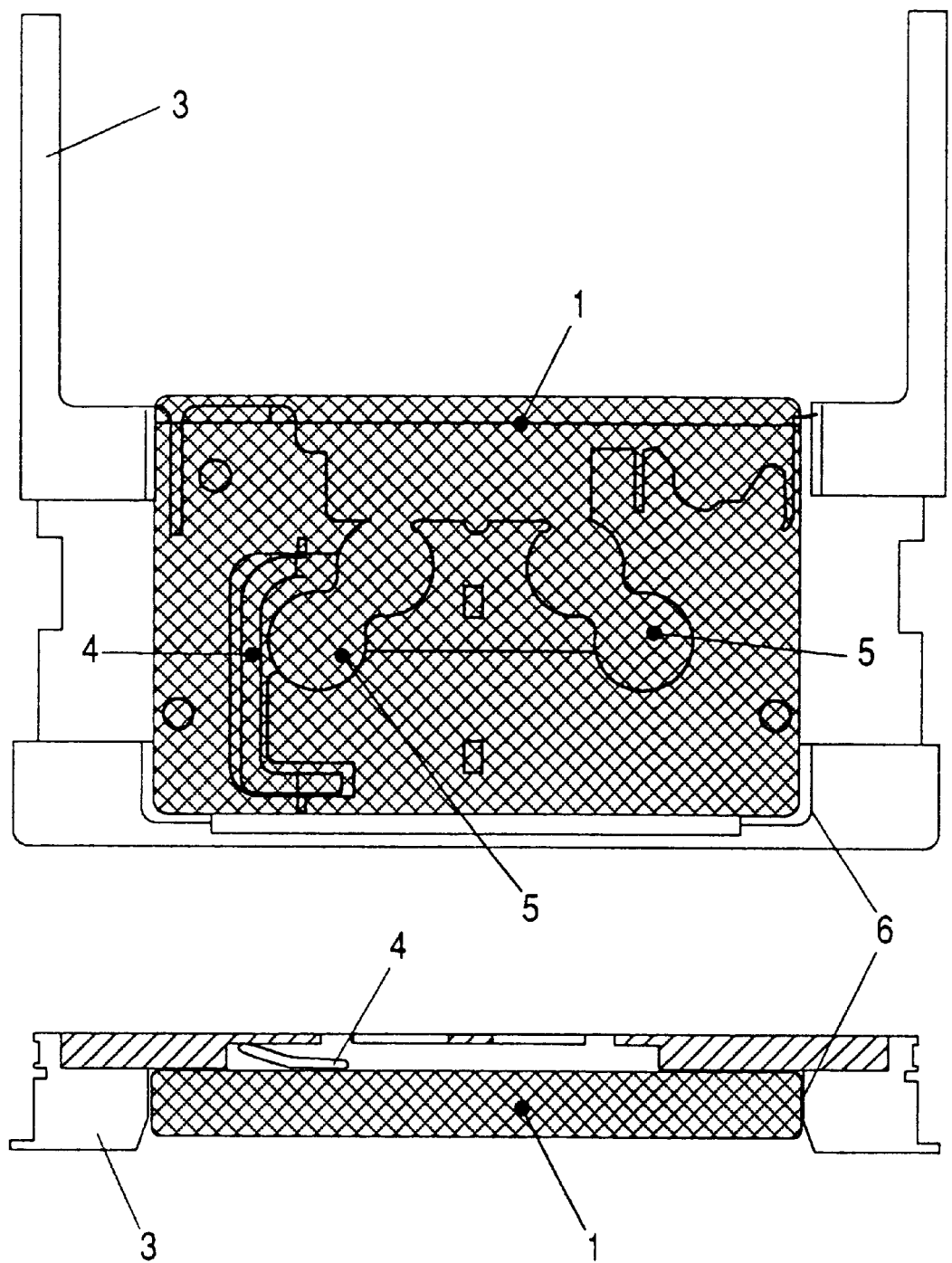

United States Patent
Dannegger et al.

[11] Patent Number: 6,024,314
[45] Date of Patent: Feb. 15, 2000

[54] APPARATUS FOR LOADING AND UNLOADING A RECORDER FOR SELECTIVELY RECEIVING VARIOUS TYPES OF CASSETTE

[75] Inventors: Bernadette Dannegger, Donaueschingen; Fritz Weisser, St. Georgen, both of Germany

[73] Assignee: Deutsche Thomson-Brandt GmbH, Villingen-Schwenningen, Germany

[21] Appl. No.: 08/814,122

[22] Filed: Mar. 10, 1997

[30] Foreign Application Priority Data

Mar. 14, 1996 [DE] Germany .................. 196 10 006

[51] Int. Cl.⁷ .................................................. G03B 23/02
[52] U.S. Cl. .............................................. 242/336; 360/94
[58] Field of Search ................... 242/336; 360/94

[56] References Cited

U.S. PATENT DOCUMENTS

| | | | |
|---|---|---|---|
| 4,490,757 | 12/1984 | Mogi | 242/336 |
| 4,873,593 | 10/1989 | Baranski | 360/94 |
| 5,314,141 | 5/1994 | Ishii et al. | 360/94 |
| 5,584,723 | 12/1996 | Suzuki | 360/94 |
| 5,598,984 | 2/1997 | Lee et al. | 242/336 |
| 5,791,577 | 8/1998 | Lee | 242/336 |
| 5,794,873 | 8/1998 | Hamaguchi | 242/336 |
| 5,822,149 | 10/1998 | Takase et al. | 360/94 |
| 5,833,158 | 11/1998 | Suzuki et al. | 242/336 |

FOREIGN PATENT DOCUMENTS

| | | |
|---|---|---|
| 0312397 | 4/1989 | European Pat. Off. . |
| 44 15 729 | 11/1995 | Germany . |

*Primary Examiner*—Donald P. Walsh
*Assistant Examiner*—Emmanuel M. Marcelo
*Attorney, Agent, or Firm*—Joseph S. Tripoli; Frederick A. Wein; Daniel E. Sragow

[57] ABSTRACT

In recorders, in particular video recorders, the use of various sizes of cassette is intended and is already customary. For this purpose, the size of the cassette must be identified and the hubs of the transport drive changed appropriately. A mechanical coupling between the winding adjustment and the loading drawer during the loading operation, has no influence on the winding adjustment if a large cassette is inserted, whereas the identification and adjustment, formed by a lever, come into mechanical contact with the winding adjustment in the case of a small cassette. The mechanical coupling is formed by a U-shaped lever, the position.

7 Claims, 4 Drawing Sheets

A

B

C

APPARATUS FOR LOADING AND UNLOADING A RECORDER FOR SELECTIVELY RECEIVING VARIOUS TYPES OF CASSETTE

The invention relates to an apparatus for loading and unloading a recorder for selectively receiving various types of cassette, the distance between the winding plates of the recorder which receive the reels of tape being variable.

For digital video recorders, the use of various types, and consequently sizes, of cassettes is planned, as is already customary in the area of VHS video recorders. In these, various types of cassette, such as for example standard cassettes and C cassettes, are used, the C cassettes usually being used in camcorders. Owing to the small space available in camcorders, the C cassettes are much smaller than the standard VHS cassettes. When C cassettes are used in VHS recorders of lower quality, so-called adapter cassettes, which receive the C cassettes, are used for playing the C cassettes. In the case of more sophisticated VHS video recorders, an apparatus for loading and unloading is provided, which is capable of operating with various types of cassette without the use of adapter cassettes. However, on account of the cassette identification and the control of the winding mechanism, the winding plates of which have to be adjusted to the appropriate distance depending on the cassette used, this apparatus is expensive and relatively complicated.

DE 44 15 729 discloses a cassette recorder for selectively receiving cassettes of various sizes, in which the distance between the winding plates receiving the reels of tape is variable. Such a cassette recorder has a slide plate, which sets the distance between the winding plates in dependence on the cassette placed in, an identification contact being provided for identifying a cassette, which contact moves the slide plate. In this case, the slide plate is adapted such that it can be connected, for example mechanically, to a cassette loading apparatus, so that the slide plate can be automatically actuated whenever a cassette, for example of the small cassette type (C (type), is placed into the cassette loading apparatus and the loading operation is begun. However, the possibility of a mechanical connection is only mentioned, and not explicitly described, in the description of the known apparatus. Furthermore, the known apparatus requires a cassette identification marking on the rear side of the corresponding cassette, into which marking the identification contact can engage.

The invention is therefore based on the object of providing an apparatus for loading/unloading a recorder with which various types of cassette can be identified in a simple way and the winding apparatus can be set correspondingly.

Advantageously, the solution according to the invention has a high cost-saving potential and a high level of reliability on account of mechanical simplicity. Use is not restricted to video recorders or digital video recorders, but can be applied to any tape transport drive which is designed for tape cassettes of various sizes.

The present invention relates to an apparatus for loading and unloading a recorder for selectively receiving various types of cassette, the recorder being provided with a winding adjustment of the transport drive which sets the tape winding plates appropriately for the cassette used, and the apparatus further has a mechanical means which identifies the type of cassette when it is placed in and appropriately makes the winding adjustment of the transport drive.

Preferably two types of cassette are used in the apparatus according to the invention, that is currently the standard VHS cassette and the C cassette, which is used in camcorders.

Preferably, the mechanical means of the apparatus according to the invention is formed by a U-shaped lever, the U-shaped lever being arranged in the base of a cassette-receiving compartment and being made to remain in a position parallel to the plane of the base by the placing in of a cassette of the first type and being made to swivel out of the plane of the base by the placing in of a cassette of the second type. Preferably, the cassette-receiving compartment is designed in the form of a loading drawer, so that the U-shaped lever is located in the base of the drawer. Preferably, the U-shaped lever is fastened in the base of the loading drawer by two pins, the base leg of the U-shaped lever being arranged in the pushing-in direction of the cassette. The pins of the U-shaped lever are preferably arranged on the outer sides of the side legs of the U-shaped lever.

Preferably, the winding adjustment for adjusting the winding plates has a slide plate, which is controlled by the mechanical means. With regard to the realizing of the mechanical means as a U-shaped lever, the latter does not come into engagement with the slide plate during the loading operation of the first cassette type, whereas it does come into engagement with the slide plate during the loading of the second cassette type. In this arrangement, the U-shaped lever displaces the slide plate in the pushing-in direction during the loading operation of the second cassette type.

Furthermore, the slide plate has a slide-plate driver which, for pushing forward the slide plate, is actuated by the U-shaped lever and, for pushing back, is actuated by a driving stop, which is arranged on the cassette pushing-in compartment.

The driving stop for the return transport of the slide plate is preferably likewise arranged on the rear side of the loading drawer. Preferably, the drawer comprises a movement mechanism, which serves for moving the drawer in and out, so that an automatic movement of the drawer is achieved.

Figure 2:
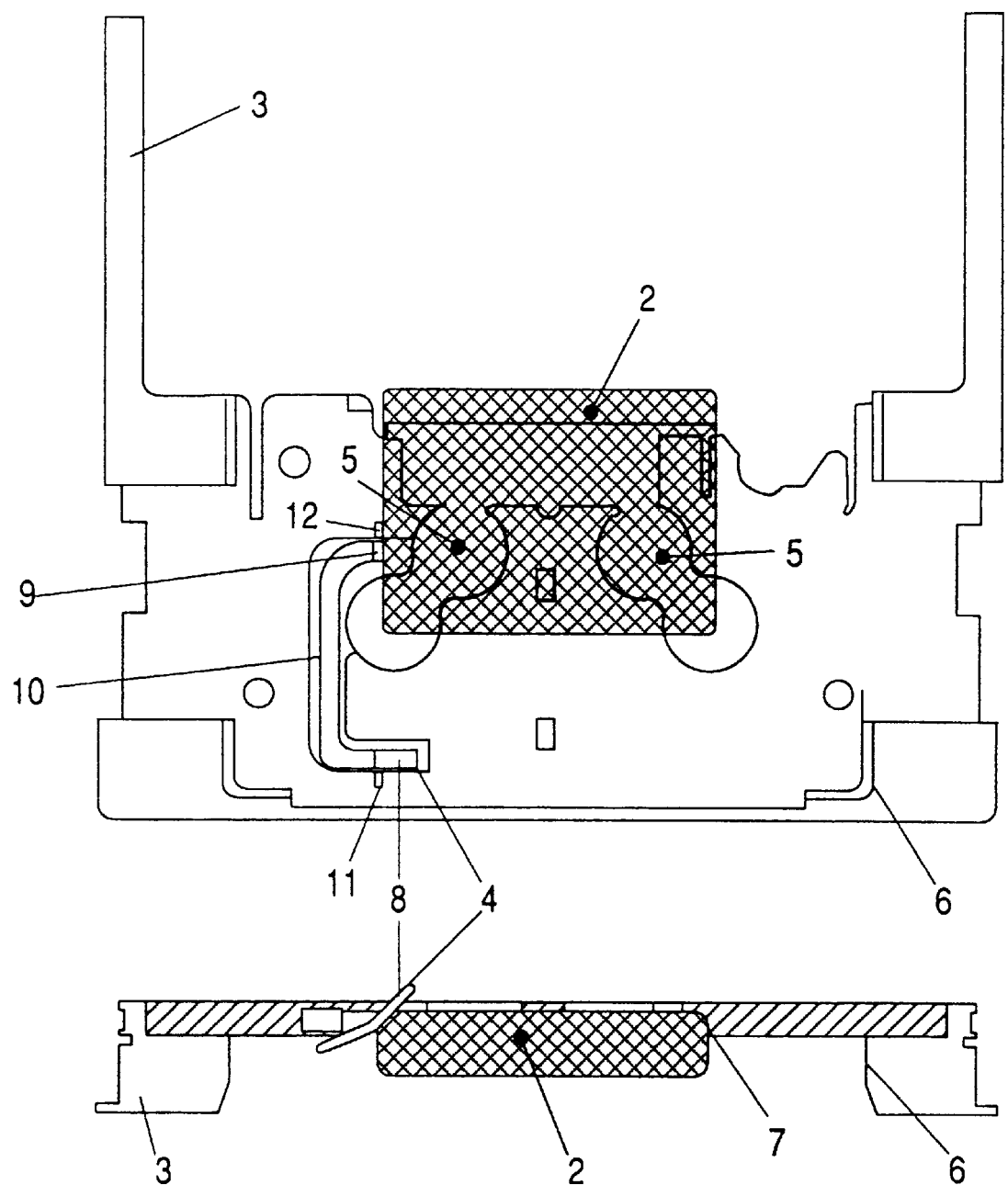
Figure 3:
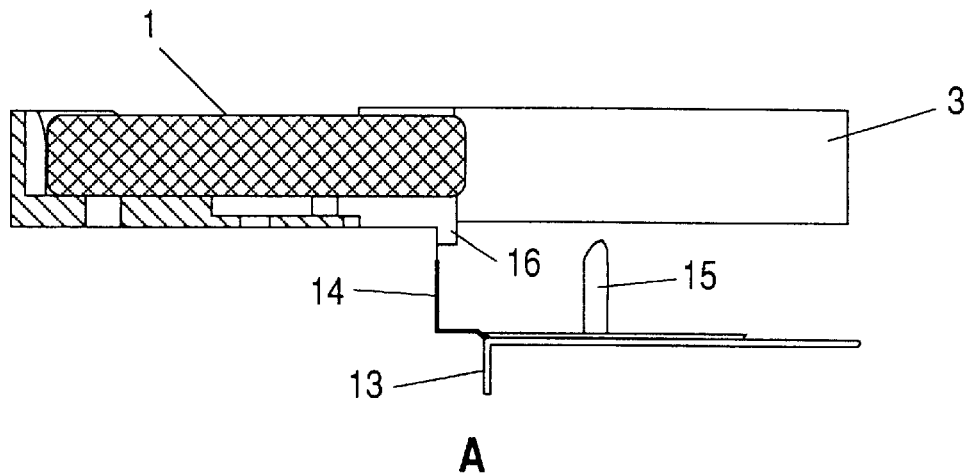
Figure 3:
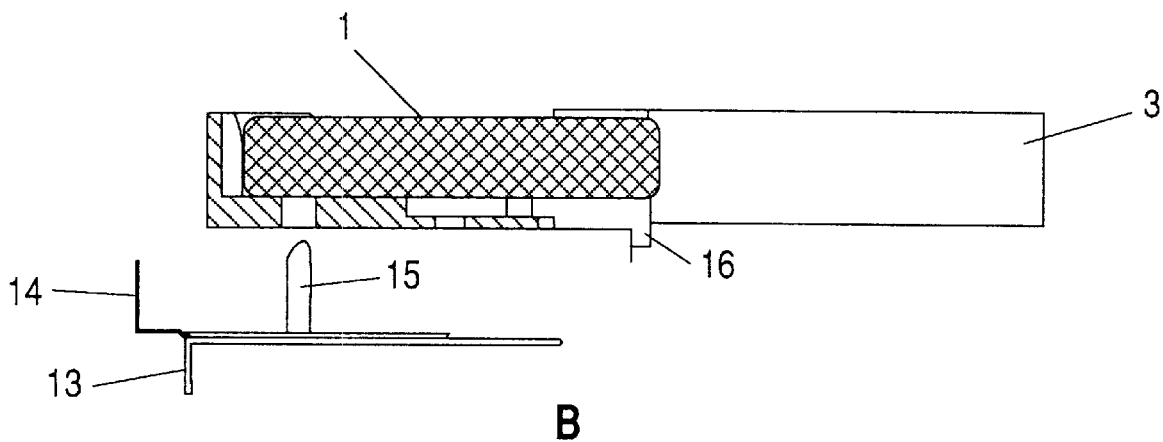
Figure 3:
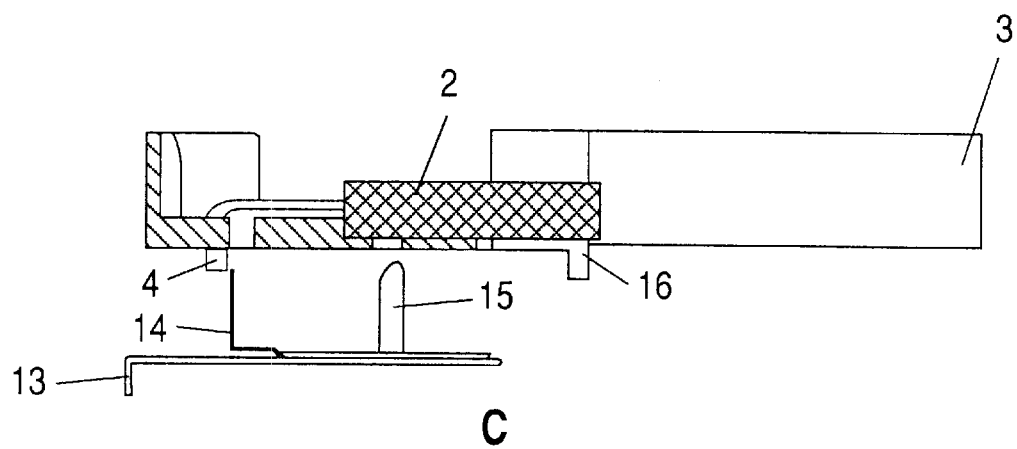
Figure 4A:
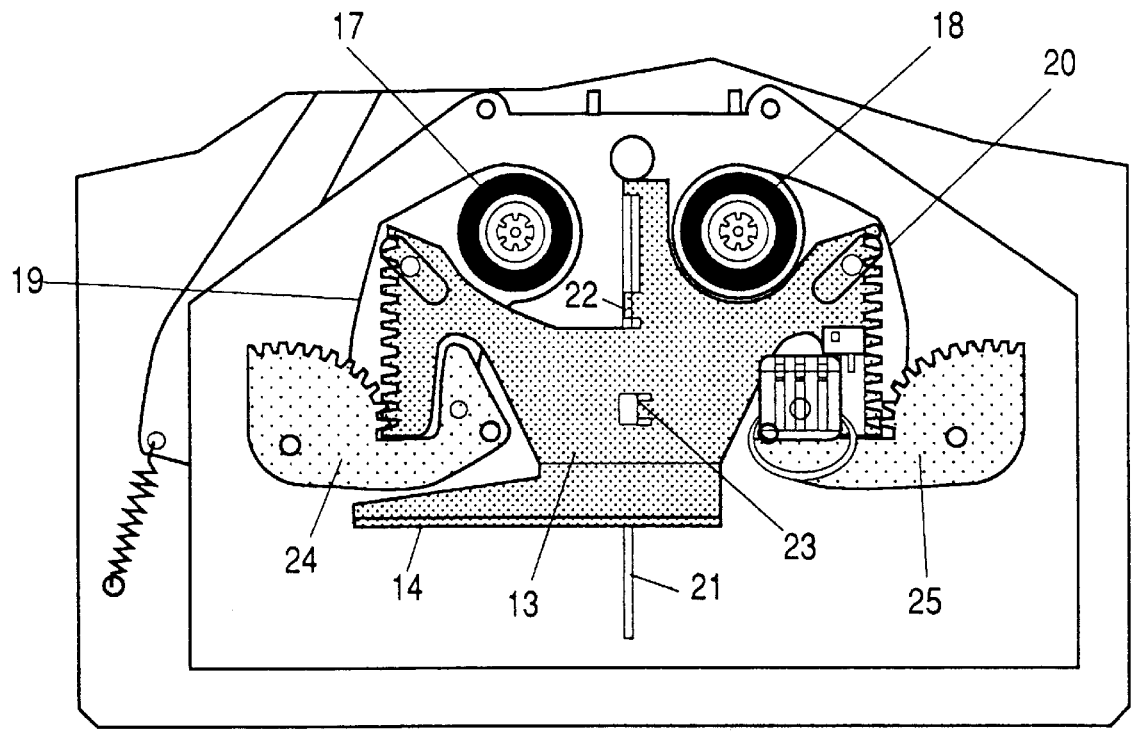
Figure 4B:
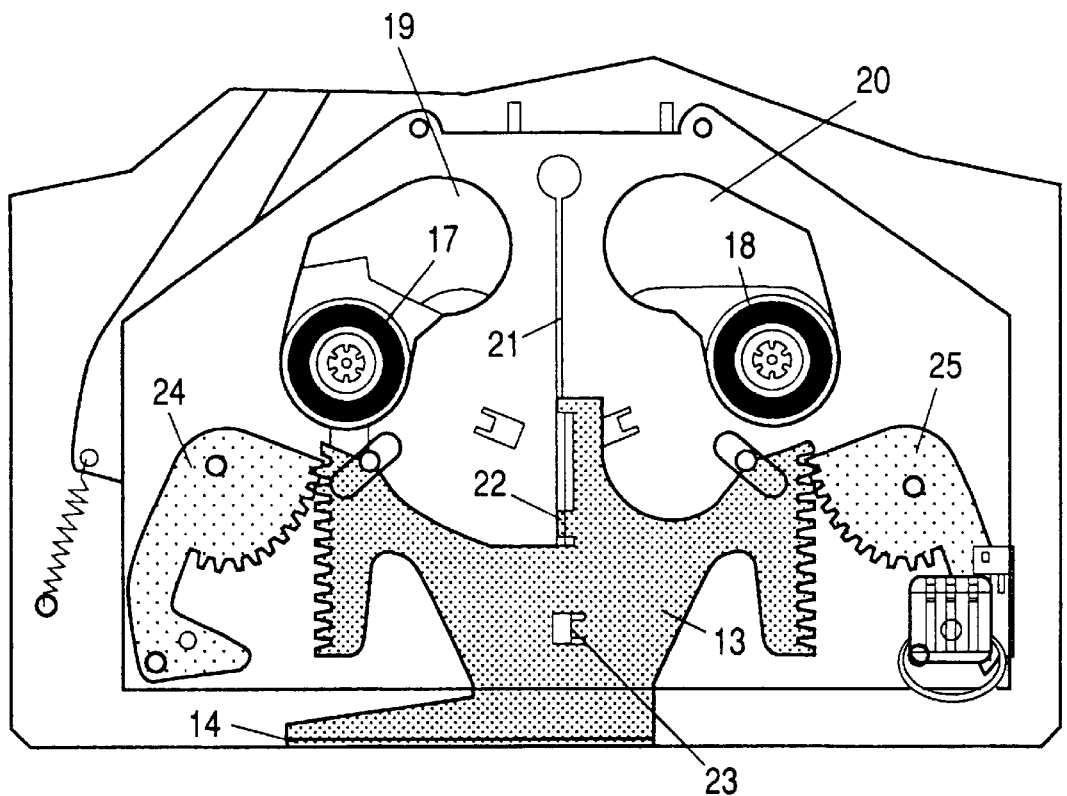

An advantageous development of the invention is described below with reference to the figures, in which:

FIG. 1 shows in the upper part a loading drawer with a standard cassette in plan view and in the lower part a loading drawer with a standard cassette in side view, and FIG. 2 shows in the upper part the loading drawer of FIG. 1 with a small cassette (C cassette) in plan view and in the lower part the drawer in side view with a small cassette, FIGS. 3A–3C show the side view of a loading drawer in various loading states with various cassettes, and FIGS. 4A and 4B show a transport drive in plan view.

FIG. 1 shows a standard VHS cassette 1, which has been placed into a loading drawer 3 of a video recorder. The loading drawer 3 has a clearance 6, which corresponds to the external dimensions of a VHS standard cassette. Arranged in the base of the loading drawer 3 is a U-shaped mechanical lever 4. Also provided in the base of the loading drawer 3 are clearances 5, into which the corresponding tape-winding plates can engage appropriately for the cassette. The lower part of FIG. 1 reveals that the U-shaped lever 4 in the case of the VHS standard cassette is arranged flush in the plane of the base of the loading drawer and bears against the bottom of the cassette 1.

FIG. 2 shows a situation corresponding to FIG. 1, with the difference that a smaller cassette, namely a C cassette 2, has been inserted into the loading drawer 3. As the lower part of FIG. 2 reveals, appropriately for the C cassette 2 there is a corresponding clearance 7 provided in the base of the loading drawer 3, so that the C cassette 2 can be received.

In a way corresponding to the arrangement of the U-shaped lever 4, the latter swivels out of the plane of the base of the loading drawer 3, so that part of the side leg 8 protrudes out of the plane of the base opposite the C cassette. FIG. 2 further reveals that the U-shaped lever is pivotably fastened and mounted in the base of the loading drawer 3 by two pins 11, 12, which are arranged on the outer sides of the side legs 8, 9 of the U-shaped lever 4. For pivoting the U-shaped lever 4 out of the plane of the base of the loading drawer 3, a spring (not shown) may be used, for example. In this embodiment, the base leg 10 of the U-shaped lever 4 is arranged in the pushing-in direction, i.e. runs parallel to the pushing-in direction of the cassette.

FIGS. 1 and 2 therefore reveal that the U-shaped lever 4 is prevented from swivelling out of the plane of the base by a standard cassette 2, whereas it swivels out of the plane, and consequently protrudes out of the rear side of the loading drawer 3, if a small cassette 2 (C cassette) is used.

Represented in FIG. 3A is a standard cassette 1 in the loading drawer 3. For adjusting the winding reels, in the recorder there is arranged underneath the loading drawer, i.e. in the cassette-receiving compartment, a slide plate 13, which is a component part of the transport drive. This slide plate 13 influences the arrangement of the winding plates (not shown), which protrude into the clearances 5 of the loading drawer 3. In other words, in one position of the slide plate 13, the distance between the two winding plates corresponds to a standard VHS cassette and, in the other position, it corresponds to a C cassette. The slide plate 13 has a slide-plate driver 14, arranged perpendicular to it. The connection of the slide plate 13 and the slide-plate driver is explained in FIGS. 4A, 4B. The slide-plate driver 14 protrudes to a point just below the loading drawer 3 in the moved-out state of the drawer 3. Also provided on the base of the loading drawer 3 is a driving stop 16. During moving out (unloading), the driving stop 16 comes into engagement with the slide-plate driver 14, so that the slide plate 13 is mechanically reset again and the winding plates are reset into the "standard VHS cassette" state. This coupling between driving stop 16 and slide-plate driver 14 is represented in FIG. 3A, which shows loading drawer 3 in the moved-out state. Because the U-shaped lever 4 does not swivel out of the base of the loading drawer 3, the slide plate 13 of the winding adjustment remains in its original position, since no force is exerted in the pushing-in direction owing to the absence of a mechanical coupling between the U-shaped lever 4 and the slide-plate driver 14 on the part of the loading drawer 90.

FIG. 3B shows the situation of the loading drawer before its latching onto the winding drive. Shown there is the point in time shortly before the cassette latches onto a bolt 15, which is responsible for winding reel disengagement and is arranged on the slide plate 13.

Finally, FIG. 3C shows the situation for a C cassette. Here, the U-shaped lever 4 has swung and is protruding out on the bottom side of the drawer 3. As a result, when the drawer 3 moves in, the slide-plate driver 14 is taken up by the lever 4 and moved in the pushing-in direction, so that the slide plate 13 is pushed forwards. As a result, a mechanism which displaces the two winding plates (not shown) is actuated, so that they are adjusted to the reels of the C cassette (see FIGS. 4A, 4B).

FIG. 4A shows the transport drive of a recorder in plan view in the position for the C cassette. The distance between the two winding plates 17, 18 corresponds to the C cassette. The displacement of the winding plates 17, 18 takes place in corresponding clearances 19, 20 by means of the slide plate 13. In this arrangement, the slide plate 13 interacts with two swivel levers 24, 25, respectively provided with a toothing. Also represented is the slide driver 14, fitted on the slide plate 13. The slide plate 13 runs in a groove 21, arranged in the pushing-in direction, by means of two guides 22, 23.

FIG. 4B shows the transport drive in the position for the standard VHS cassette, the slide plate 13 with the slide driver 14 having travelled back, seen in the pushing-in direction (i.e., with regard to the plan view, into a lower position). The distance between the winding plates 17, 18 in the clearances 19, 20 corresponds to the standard VHS cassette.

We claim:

1. Apparatus for loading and unloading a recorder for selectively receiving various types of tape cassette, comprising a U-shaped lever by means of which the type of cassette is identified, and a winding adjustment controllable through said U-shaped lever for setting tape winding plates appropriately for a tape cassette when its type is identified.

2. Apparatus according to claim 1, wherein the U-shaped lever is arranged in the base of a loading drawer and is made to remain in a position parallel to the plane of the base of the drawer by the placing in of a cassette of a first type and is made to swivel out of the plane of the base of the drawer by the placing in of a cassette of a second type.

3. Apparatus according to claim 2, wherein the U-shaped lever is fastened in the base of the loading drawer by two pins and the U-shaped lever is arranged with a base leg in the loading direction of the cassette.

4. Apparatus according to claim 3, wherein the pins are arranged on the outer sides of side legs of the U-shaped lever.

5. Apparatus according to claim 1, wherein the winding adjustment is controllable via a slideplate which does not come into engagement with the U-shaped lever during the loading operation of a first cassette type and comes into engagement with the slide plate during loading of second cassette type.

6. Apparatus according to claim 5, wherein the U-shaped lever displaces the slide plate in the loading direction of the cassette during the loading operation of the second cassette type.

7. Apparatus according to claim 6, wherein the slide plate has a slide-plate driver which, for moving forward the slide plate, is actuated by the U-shaped lever and, for moving back the slide plate, is actuated by a driving stop, which is arranged on a loading drawer.

* * * * *